United States Patent
Grobbel

(10) Patent No.: US 8,764,593 B2
(45) Date of Patent: Jul. 1, 2014

(54) SOUND-DAMPING UNIT FOR A SPROCKET, AND SPROCKET

(75) Inventor: Burkhard Grobbel, Schmallenberg (DE)

(73) Assignee: Ketten-Wulf Betriebs-GmbH, Eslohe-Kueckelheim (DE)

(*) Notice: Subject to any disclaimer, the term of this patent is extended or adjusted under 35 U.S.C. 154(b) by 112 days.

(21) Appl. No.: 12/741,100

(22) PCT Filed: Oct. 15, 2008

(86) PCT No.: PCT/EP2008/008689
§ 371 (c)(1),
(2), (4) Date: May 3, 2010

(87) PCT Pub. No.: WO2009/056219
PCT Pub. Date: May 7, 2009

(65) Prior Publication Data
US 2010/0273589 A1  Oct. 28, 2010

(30) Foreign Application Priority Data
Nov. 3, 2007 (DE) .................. 20 2007 015 303 U

(51) Int. Cl.
F16H 55/30 (2006.01)
F16H 57/00 (2012.01)
B32B 27/00 (2006.01)
B32B 7/02 (2006.01)
F16F 7/00 (2006.01)

(52) U.S. Cl.
USPC .................................................. 474/94

(58) Field of Classification Search
USPC ................................. 474/94, 161
See application file for complete search history.

(56) References Cited

U.S. PATENT DOCUMENTS

| 3,257,860 A | * | 6/1966 | Runde et al. ............. 474/94 |
| 4,261,214 A | * | 4/1981 | Watanabe et al. .......... 474/156 |
| 4,348,199 A | * | 9/1982 | Oonuma et al. ........... 474/156 |
| 4,486,183 A | * | 12/1984 | Posiviata et al. ........... 474/94 |
| 4,752,281 A | * | 6/1988 | Lammers ................. 474/162 |
| 5,026,329 A | * | 6/1991 | Diekevers ................ 474/162 |
| 5,360,378 A | * | 11/1994 | Suzuki et al. ............ 474/161 |
| 5,441,458 A | * | 8/1995 | Rogus ................... 474/189 |
| 5,819,910 A | * | 10/1998 | Langer et al. ............ 198/834 |
| 6,074,318 A | * | 6/2000 | Tanaka et al. ............ 474/207 |
| 6,371,874 B1 | * | 4/2002 | Inoue .................... 474/156 |
| 2007/0021249 A1 | | 1/2007 | Shao et al. |
| 2009/0093329 A1 | * | 4/2009 | Markley et al. .......... 474/161 |

FOREIGN PATENT DOCUMENTS

DE  2824104 A1  12/1978
DE  4232754 A1  3/1994
(Continued)

*Primary Examiner* — William E Dondero
*Assistant Examiner* — Mark K Buse
(74) *Attorney, Agent, or Firm* — Laurence A. Greenberg; Werner H. Stemer; Ralph E. Locher

(57) ABSTRACT

A sound-damping unit for a sprocket has a mounting foot for connection to a sprocket and an elastic body placed on the mounting foot that is suitable for cushioning a chain running onto the sprocket. The elastic body is provided with a protective cap or protective layer. A sprocket according to the invention includes a circular sprocket disc having a number of teeth and tooth gaps in the circumferential direction. The sprocket is equipped with at least one sound-damping unit that is configured to reduce the noise upon a chain running onto said sprocket. The sound-damping unit is at least one sound damping unit as above.

18 Claims, 2 Drawing Sheets

(56) References Cited

FOREIGN PATENT DOCUMENTS

| EP | 0564710 | A1 | 10/1993 |
| FR | 2696224 | A3 | 4/1994 |
| JP | 51100424 | A | 9/1976 |
| JP | 52004629 | U | 1/1977 |
| JP | 53064860 | U | 5/1978 |
| JP | 54058550 | U | 4/1979 |

\* cited by examiner

Fig.1 Fig.2 Fig.3 Fig.4
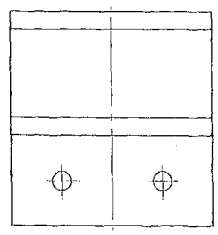 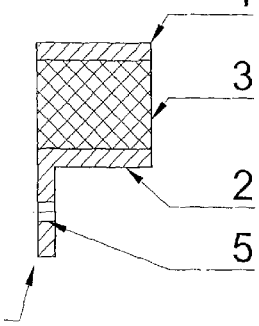 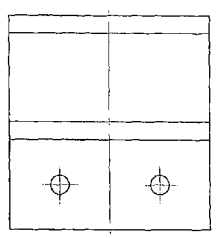 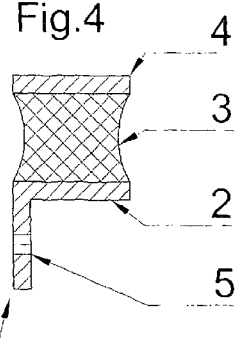
Fig.5 Fig.6 Fig.7 Fig.8
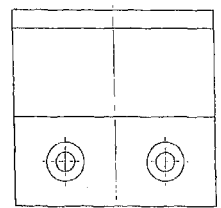 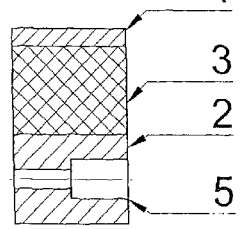 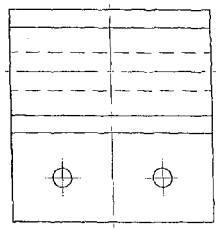 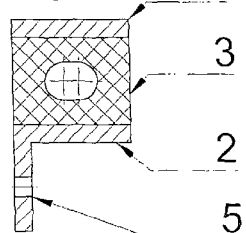

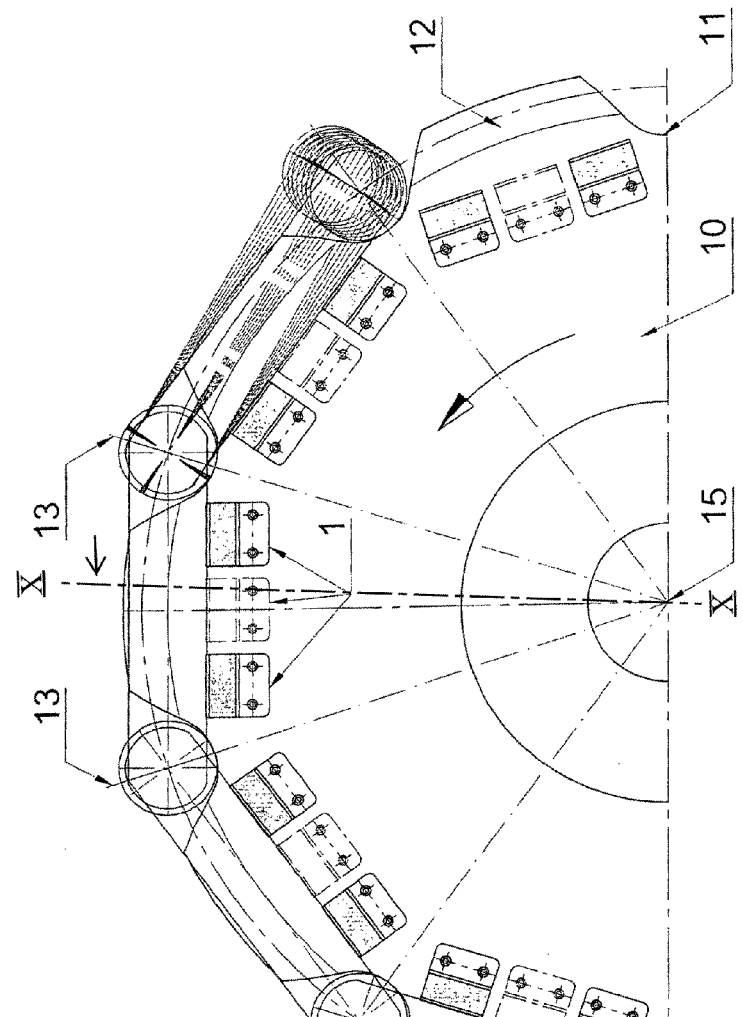
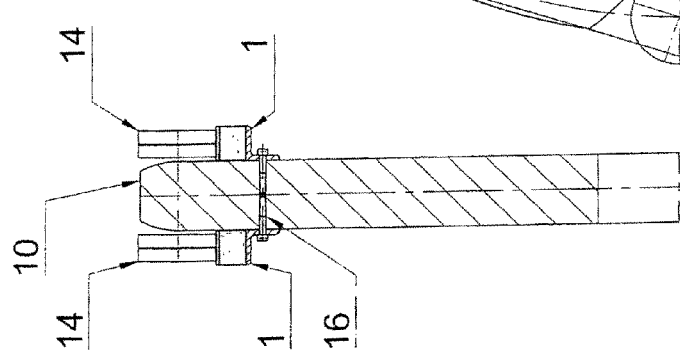

SOUND-DAMPING UNIT FOR A SPROCKET, AND SPROCKET

BACKGROUND OF THE INVENTION

Field of the Invention

The present invention relates to a sound-damping unit for a sprocket having a mounting base for connection to a sprocket and an elastic body mounted on the mounting base, which is suitable for cushioning a chain running onto a sprocket. The invention also pertains to a sprocket with a circular sprocket disc having a number of teeth and tooth gaps in the circumferential direction. The sprocket is equipped with at least one sound-damping unit, adapted to reduce the noise development as a chain runs on the sprocket.

A sound-damping unit for a sprocket is known, that comprises an essentially rigid mounting base and an essentially elastic body. The mounting base is preferably an element L-shaped in cross-section of a steel material that is on the one hand equipped with corresponding bores for attachment on a sprocket and on the other hand serves as a support for the elastic body. The elastic body is preferably a rectangular cuboid. For sound-damping purposes, a number of such sound-damping units are mounted on a sprocket in such a way that a chain running onto the sprocket can be supported by the elastic bodies. The noise generated by a chain drive is essentially due to the impact of the chain on the teeth, or tooth gaps of the sprocket. The sound-damping units have the effect that the chain first impacts on the elastic body so that the chain is received onto the teeth, or in the tooth gaps in an essentially braked manner.

A drawback in this context is the wear and tear of the elastic bodies arising from the continual impact of the chain on the elastic body of the sound-damping units, and the linear movement of the chain links, occurring to a smaller extent, caused by the displacement of the chain pivots within the tooth gaps during rotation about the sprockets.

This is where the present invention comes in and has the object of suggesting a sound-damping unit for a sprocket that has reduced wear and tear.

BRIEF SUMMARY OF THE INVENTION

According to the present invention, this object is achieved by a sound-damping unit as claimed. The wear and tear of the sound-damping unit, in particular of the elastic body, can be substantially reduced by equipping the elastic body with a protective cap or protective coating for wear reduction. This measure is not necessarily self-evident since the person skilled in the art will first be reluctant to give up the sound-damping properties of the elastic body by providing a protective cap that usually has to be of a harder material than the elastic body, since further noise development must be expected due to the hard material. Surprisingly, the noise development caused by the protective cap according to the present invention is limited, however, and the advantages of low wear and tear clearly predominate.

In an advantageous embodiment of the suggested sound-damping unit, it can be provided that the material of the protective cap or protective coating has greater hardness than the material of the elastic body. Surprisingly it was found that the noise development does not significantly increase in spite of the harder material of the protective cap, such as steel, for example.

In an advantageous embodiment of the suggested invention it can be provided that the material of the protective cap or the protective coating is a plastic, in particular polypropylene, polyethylene, polyurethane or a steel material, or a hard rubber.

An advantageous material of the elastic body is, for example, an elastomer, such as natural rubber (NR), acrylonitrile-butadiene rubber (NBR), styrene-butadiene rubber (SBR), chloroprene rubber (CR), butadiene rubber (BR), or ethylene-propylene-diene rubber (EPDM), or a polyurethane elastomer with a homogeneous or cellular structure or combinations of these plastics amongst each other, for example, with different degrees of hardness.

In a material and weight-saving variant of the suggested sound-damping unit, it can be provided that the mounting base has an L-shape in cross-section or is a rectangular cuboid.

For the advantageous attachment of the suggested sound-damping unit, it can be provided that the mounting base is equipped with bores, in particular with through bores, for receiving bolts.

In an advantageous embodiment of the suggested sound-damping unit, it can be provided that the elastic body has an hourglass shape and/or is provided with an additional internal contour (e.g. oval bore). By these means, the spring-damping characteristic is, of course, changed, or it can be more or less purposefully influenced. The hourglass shape also has the advantage that the elastic body, in the loaded state, does not or not so quickly engage the planar surface of the sprocket. By these means unnecessary wear and tear can be avoided.

It is a further object of the suggested invention to suggest a sprocket, comprising a circular sprocket disc with a number of teeth and tooth gaps in the circumferential direction, wherein the sprocket is equipped with at least one sound-damping unit, which is arranged to reduce the noise development as a chain runs onto the sprocket, wherein a long useful life should be achieved for the sound-damping unit.

According to the present invention, this object is achieved by a sprocket as claimed. A longer useful life of the entire sprocket can be realized by using at least a sound-damping unit as claimed due to the wear-reducing protective cap. The advantages are substantial if it is taken into account that such sprockets are used in escalators, for example, and exchanging the sound-damping units leads to the entire escalator having to be temporarily put out of operation.

In an advantageous embodiment of the suggested sprocket it can be provided that the sprocket is equipped with sound-damping units on both sides. By these means the useful life of the sprocket according to the present invention can be further extended since the sound-damping reception of the chain can be carried out by a greater number of sound-damping units than would be possible if the sound-damping units were only mounted on one side. The noise can thus be further reduced.

In a further advantageous embodiment of the suggested sprocket according to the present invention it can be provided that the sound-damping units are arranged within circular segments and below the teeth, wherein the circular segments are defined by geometric connecting lines between the center point and the tooth gaps. In this area between the tooth gaps, advantageously, the chain links can be received by the sound-damping units, and the result is a sequential "rolling off" of the chain links on the sound-damping unit, as it is indicated in FIG. 9 by the broken-line chain links, or chain bolt. By these means, the chain impacts on the sprocket with particularly low noise.

In a further advantageous embodiment of the suggested invention, it can be provided that optionally one, two or three, or more sound-damping units are mounted in each circular segment. Depending on the case of application, a corresponding number of sound-damping units can be mounted.

In a further advantageous embodiment of the suggested invention, it can be provided that the sound-damping units are mounted below each of the tooth gaps so that the chain bolts of the chain can be received by the respective sound-damping unit. For relevant cases of application, such an arrangement of the sound-damping units can be advantageous, for example because the chain links are too narrow to be received on the sound-damping units. This measure can be provided additionally or alternatively to the mounting of the sound-damping units below the teeth.

In a further advantageous embodiment of the sprocket according to the present invention, it can be provided that a number of bores, preferably through bores, are provided for receiving the sound-damping units in the sprocket.

In a further advantageous embodiment of the suggested sprocket according to the present invention, it can be provided that a greater number of bores than necessary is provided so that each possible mounting position of the sound-damping unit can be realized. By providing a greater number of bores, which need not necessarily all be used to mount sound-damping units, the technician on site is still free to decide which arrangement and number of sound-damping units to choose.

Experiments have shown that a mounting position of sound-damping units enabling a spring-deflection of the elastic body between applied and non-applied chain by about 1 to 5 mm has a particularly advantageous noise-reducing effect.

BRIEF DESCRIPTION OF THE SEVERAL VIEWS OF THE DRAWING

Further features and advantages of the present invention will be apparent with reference to the following description of preferred exemplary embodiments with reference to the accompanying drawings, wherein:

FIG. 1 is a front view of a sound-damping unit according to the present invention;

FIG. 2 is a sectional view of a sound-damping unit according to the present invention;

FIG. 3 is a front view of a first alternative embodiment of a sound-damping unit according to the present invention (alternative embodiment of the elastic body);

FIG. 4 is a sectional view of a first alternative embodiment of a sound-damping unit according to the present invention (alternative embodiment of the elastic body), FIG. 5 is a front view of a second alternative embodiment of a sound-damping unit according to the present invention (alternative embodiment of the mounting base);

FIG. 6 is a sectional view of a second alternative embodiment of a sound-damping unit according to the present invention (alternative embodiment of the mounting base);

FIG. 7 is a front view of a third alternative embodiment of a sound-damping unit according to the present invention (alternative embodiment of the elastic body);

FIG. 8 is a sectional view of a third alternative embodiment of a sound-damping unit according to the present invention (alternative embodiment of the elastic body);

FIG. 9 is a side view of a sprocket according to the present invention; and

FIG. 10 is a sectional view of a sprocket according to the present invention, taken along the line X-X in FIG. 9.

DESCRIPTION OF THE INVENTION

Reference is first made to FIG. 1.

A sound-damping unit 1 according to the present invention essentially comprises a mounting base 2, an elastic body 3 and a protective cap 4.

The mounting base 2 has an essentially L-shaped cross-section, wherein one of the legs is provided for receiving the elastic body 3 and the other leg is for mounting on the sprocket 10. For this purpose, bores 5 can be provided in the leg of the mounting base 2, through which corresponding bolts can be passed. The L-shaped mounting base is preferably provided with simple (i.e. cylindrical) bores 5. Existing bolt heads and nuts can be covered by the elastic bodies.

The mounting base 2 can also have other shapes, such as the shape of a rectangular cuboid (cf. FIGS. 5 and 6). Accordingly, the elastic body would be provided on one of the side surfaces of the rectangular cuboid, and corresponding bores would be provided in the rectangular cuboid, through which the bolts can be inserted. The bores of the rectangular cuboid-shaped mounting base can be preferably stepped bores or countersunk bores suitable for receiving the bolt heads or nuts.

The elastic body 3 is preferably an elastomer such as a natural rubber (NR), acrylonitrile-butadiene rubber (NBR), styrene-butadiene rubber (SBR), chloroprene rubber (CR), butadiene rubber (BR), or ethylene-propylene-diene rubber (EPDM), or a polyurethane elastomer with a homogeneous or cellular structure, or combinations of these plastic materials amongst each other, for example, with different degrees of hardness. The elastic body is preferably glued, or cured, to the mounting base 2.

The elastic body 3 can also have an hourglass shape and/or have an additional interior contour (e.g. an oval bore). By these means, the spring-damping characteristic is, of course, changed, or it can be more or less intentionally influenced. The hourglass shape also has the advantage that the elastic body, in the loaded state, does not or not so quickly engage the planar surface of the sprocket. This is how unnecessary wear and tear can be avoided.

According to the present invention, the elastic body 3 is equipped with a protective cap 4 or coating on a side facing the chain to be received in a mounted state, which is more rugged and wear-resistant than the elastic body. A preferred material for a protective cap 4 is, for example, polypropylene, polyurethane, a steel material or a hard rubber.

A sprocket 10 that is also part of the present invention with a sound-damping unit 1 according to the present invention is shown in FIGS. 9 and 10. As is shown here, a number of sound-damping units 1 are arranged on the side surfaces of the sprocket 10. Optionally it can be provided that sound-damping units 1 are only provided on one side of the sprocket 10 (not shown) or on both sides of the sprocket 10. In principle it is provided that the sound-damping units 1 are arranged on the sides of a geometric polygon about the center point 15 of the sprocket 10. Furthermore, variations with respect to the position of the sound-damping units 1 with respect to the teeth 12, or tooth gaps 11, are also conceivable. If, for example, a straight connection line 13 is drawn from the center point 15 of the sprocket 10 to each of the tooth gaps 11, the sprocket 10 is thus subdivided into a number of segments. While the arrangement of two sound-damping units 1 in such a segment and below the teeth 12 is provided in the drawings, the dot-dashed sound-damping unit 1 indicates the position of a single sound-damping unit 1 between the tooth gaps 11. It is, of course, also conceivable to arrange all three or even more sound-damping units 1 in such a segment. It is also possible to arrange the sound-damping units 1 immediately below the tooth gaps (not shown).

To mount the sound-damping units 1, a number of bores 16, preferably through bores, are provided at corresponding positions of the sprocket 10. It can be advantageously provided that a maximum number of bores 16 is provided that need not all necessarily be used for mounting sound-damping units 1. The technician on site is still free to decide in this case which arrangement to choose for the sound-damping units 1.

The dimensioning and positioning of the sound-damping units 1 on the sprocket 10 is carried out in such a manner in practice that they provide a spring displacement of only a few millimeters, preferably 1 to 5 mm. This spring displacement must be essentially adjusted as a function of the dimensions of the conveyor chain.

The damping elements suggested here can, measured according to the structural height, realize considerable spring displacements, in other words, there is a favorable ratio between the spring displacement and the overall height.

The invention claimed is:

1. A sprocket, comprising:
    a circular sprocket disc formed with a plurality of teeth and tooth gaps along a circumferential direction;
    a plurality of sound-damping units mounted to said sprocket disc on at least one side of said sprocket disc for reducing a noise development when a chain runs onto the sprocket, said sound-damping units being separately and individually mounted at a plurality of positions on the at least one side of said sprocket disc along the circumferential direction of said sprocket disc;
    said sound-damping units including:
        a mounting base for connection to said sprocket;
        an elastic body mounted on said mounting base and configured for cushioning a chain running onto the sprocket;
        a protective cap or a protective coating disposed on said elastic body;
    circle segments defined by geometric connection lines between a center point of the sprocket and said tooth gaps;
    said sound damping units being sized for mounting below said tooth gaps and in said circle segments and said sound-damping units being respectively disposed below said tooth gaps or within circle segments and below said teeth.

2. The sprocket according to claim 1, wherein said sound-damping units are disposed on both sides of the sprocket, with each of the two sides of the sprocket carrying a plurality of said sound-damping units.

3. The sprocket according to claim 1, wherein one, two, three, or more sound-damping units are mounted in each said circle segment.

4. The sprocket according to claim 1, wherein the sprocket is formed with a number of bores for receiving said sound-damping units.

5. The sprocket according to claim 4, wherein a number of said bores is greater than a number of said sound-damping units in the sprocket, enabling a variety of possible mounting positions of said sound-damping unit.

6. The sprocket according to claim 1, wherein a mounting position of said sound-damping units is chosen such that a spring displacement of said elastic body, between when the chain is applied and when the chain is not applied, amounts to about 1 to 5 mm.

7. The sprocket according to claim 1, wherein a material of said protective cap or protective coating has a greater hardness than a material of said elastic body.

8. The sprocket according to claim 1, wherein said protective cap or protective coating is formed of a material selected from the group consisting of plastic material, steel, and hard rubber.

9. The sprocket according to claim 8, wherein said material of said protective cap or protective coating is polypropylene or polyurethane.

10. The sprocket according to claim 1, wherein said elastic body is formed of elastomer material.

11. The sprocket according to claim 10, wherein said material of said elastic body is an elastomer material selected from the group consisting of natural rubber, acrylonitrile-butadiene rubber, styrene-butadiene rubber, chloroprene rubber, butadiene rubber, and ethylene-propylene-diene rubber, or a polyurethane elastomer with a homogeneous or cellular structure, or a combination thereof.

12. The sprocket according to claim 11, wherein said material of said elastic body is a combination of plastic materials with different degrees of hardness.

13. The sprocket according to claim 1, wherein said mounting base has an L-shape in cross-section or a shape of a rectangular cuboid.

14. The sprocket according to claim 1, wherein said mounting base has bores formed therein for receiving bolts.

15. The sprocket according to claim 14, wherein said bores are one or more bores selected from the group consisting of through bores, stepped bores, and countersunk bores.

16. The sprocket according to claim 1, wherein said elastic body has a form of a rectangular cuboid or of an hourglass shape and is provided with an inner contour.

17. The sprocket according to claim 1, wherein said elastic body is formed with an oval bore.

18. The sprocket according to claim 1, wherein said sound-damping units are a plurality of individual units separately mounted to said sprocket disc about a circumference thereof.

* * * * *